United States Patent [19]

Stanley

[11] Patent Number: 5,622,541
[45] Date of Patent: Apr. 22, 1997

[54] GLASS FEEDERS

[75] Inventor: George M. Stanley, Dunstable, United Kingdom

[73] Assignee: BH-F (Engineering) Limited, England

[21] Appl. No.: 429,112

[22] Filed: Apr. 27, 1995

Related U.S. Application Data

[63] Continuation of Ser. No. 146,200, filed as PCT/GB92/00895, May 18, 1992 publsihed as WO92/20630, Nov. 26, 1992, abandoned.

[30] Foreign Application Priority Data

May 17, 1991 [GB] United Kingdom ............... 9110807

[51] Int. Cl.⁶ ..................... C03B 5/18; C03B 5/26; C03B 7/08
[52] U.S. Cl. ..................... 65/180; 65/328; 65/330; 65/331; 65/126; 65/129
[58] Field of Search ............... 65/129, 126, 325, 65/328, 330, 331, 180, 128, 179

[56] References Cited

U.S. PATENT DOCUMENTS

| | | | |
|---|---|---|---|
| 2,340,729 | 2/1944 | Barker | 65/328 |
| 2,688,469 | 9/1954 | Hohmann | 65/180 |
| 2,969,614 | 1/1961 | Stewart. | |
| 4,832,725 | 5/1989 | Rehring | 65/180 |

*Primary Examiner*—Peter Chin
*Assistant Examiner*—Steven P. Griffin
*Attorney, Agent, or Firm*—Breiner & Breiner

[57] ABSTRACT

A basin for a forehearth of a glass-making furnace having an internal volume divided into upper and lower portions by an annular shoulder is described wherein the horizontal cross-sectional area of the upper portion is significantly greater than that of the lower portion. The base of the basin has a glass discharge outlet therein. In use, the discharge outlet is aligned with a relatively movable cylinder which acts as a flow metering valve. The cylinder can be rotated about its axis at a constant or adjustable speed, or the cylinder can be non-rotating and have a separately driven stirrer movable about it to prevent or reduce the formation of stagnant areas.

6 Claims, 2 Drawing Sheets

5,622,541

GLASS FEEDERS

This is a continuation of application Ser. No. 08/146,200, filed as PCT/GB92/00895, May 18, 1992 published as WO92/20630, Nov. 26, 1992, now abandoned.

FIELD OF INVENTION

This invention relates to glass feeders and, in particular, to feeder arrangements for feeding molten glass from a furnace forehearth to one or more processing stations where the molten glass is converted into useful objects, for example, bottles and jars.

BACKGROUND OF THE INVENTION

In the production of glass objects, particularly the mass production of bottles and jars, on a continuous basis, it is of considerable importance to be able to control the characteristics of the glass as it leaves the furnace and moves towards an appropriate forming unit, for example an independent section container forming machine of known type.

It is well appreciated that major problems can arise in terms of consistency of manufacture if great care is not taken to operate under homogeneous and effectively invariant conditions. The problem, however, is that the attainment of such conditions is particularly difficult to achieve.

Conventionally, glass is manufactured by charging the raw materials into one end of an essentially elongate furnace while applying heat, for example from oil burners, to heat the raw materials and fuse them together to form a glassy mass. The glassy mass moves away from the ingredient feed point, down the furnace, gradually becoming more and more homogeneous. It then flows, very slowly since it is very viscous, into a number of channels, perhaps as many as six or eight in a large furnace, known as forehearths and at the end of each channel there is located in the floor of the channel an aperture through which molten glass is discharged.

By ensuring a sufficient length of forehearth, and by applying appropriate insulation and/or heating, it is possible to ensure that, by the time the glass reaches the end of the forehearth and is ready for discharge, it is relatively free of bubbles and has a relatively stable internal pattern of temperature and viscosity. It is not, however, easy to ensure that discharge from the forehearth is always even.

A major problem arises from the fact that the glass, when discharged, must be in a highly viscous state, so that it may be moulded and, at the same time, cooled such that as it is moulded to its final shape, it has cooled to a temperature at which it is effectively sufficiently rigid to maintain that shape during subsequent cooling and annealing steps. Because the glass on discharge to the forehearth is highly viscous, and because, in any event, it moves very slowly, attempts to control the precise temperature and homogeneity of the emergent glass are fraught with difficulty.

In order to be able to control the overall flow of glass from the forehearth, it is a known practice to provide located above the aperture or apertures in the forehearth through which molten glass may pass, a metering cylinder which may be lowered on to the forehearth floor to prevent glass flow, and may be raised to permit glass to flow under its edge and through the aperture or apertures in the forehearth floor. In operation, such a cylinder may be rotated about its axis when it has been raised a little way from the forehearth floor, and such rotation can assist in homogenising the glass, but only to a limited extent. Alternatively, the cylinder may be stationary, and other stirring members moved in the glass to promote an homogeneous glass condition within the region above the aperture(s). Actual discharge of the molten glass through the aperture is conventionally achieved by the use of one or more vertically reciprocating plungers above the aperture(s) which act to form successive gobs of glass below the aperture which are cut off by synchronised shears to fall into a chute and be transported to a forming station.

Such a system is disclosed, for example, in U.S. Pat. No. 3,133,803, and, in addition, in that case flow may be adjusted by the use of a vertically-adjustable skimmer block set in the roof of the forehearth and which acts as a gate under which molten glass flows before running across a shallow land and down an inclined wall set to one side of a well into which the glass then flows and which surrounds the metering cylinder and gob plunger, and in which a shallow layer of molten glass forms. The glass is spread out in an attempt to render it more easily heatable or coolable, but such spreading out leads to problems of uneven flow and possible bubble entrainment.

Such an approach using a thin glass layer is unconventional, and has not been adopted widely in practice. In contrast, conventionally, the depth of glass in a forehearth is 100 to 160 mm, this depth being a compromise between making the forehearth sufficiently shallow that the temperature of the glass passing through it can be quickly controlled with little thermal lag, and making the forehearth deep enough to enable sufficient glass to flow along it. The discharge end of the forehearth is conventionally even deeper, for example 200 to 350 mm, giving a reservoir of glass of supposedly even characteristics from which gobs are successively drawn.

BRIEF DESCRIPTION OF INVENTION

We have now found surprisingly that substantially improved homogeneity, together with improved possibilities for glass condition control, may be achieved by relating the shape of the discharge end of the forehearth to the provision of a glass-flow metering cylinder.

Thus, according to a first feature of the present invention, there is provided a dispenser basin for the forehearth of a glass-making furnace and intended to be full of glass when in use, the basin having in its base a glass-discharge outlet, and having in its internal surface a substantially-annular shoulder notionally dividing the basin volume vertically into a lower portion and an upper portion, in which the lower portion has a horizontal cross-sectional area which is substantially less than that of the upper portion, and in which the depth of the shoulder from the intended free surface of the glass in the basin is about half the depth of glass in the basin during use, and a sleeve in the upper portion of the basin, characterised in that the sleeve constitutes a metering cylinder which projects downwardly into the lower portion of the basin, and is movable vertically whereby the gap of adjustable width between the bottom of the sleeve and the base of the basin functions as a metering orifice.

The metering cylinder may be rotated as well as being movable vertically.

In the use of such a basin, it is found that the consistency of the output of molten glass from the orifices in the floor of the basin, whether that output be a continuous flow or in the form of successive gobs, is substantially improved with respect to conventional known arrangements. The exact reasons for this are not clear, but it appears that treatments designed to assist in conditioning the glass and rendering it homogeneous in the forehearth continue to operate on the larger surface area upper region of molten glass, while in the lower, relatively much smaller cross sectional area, section, a rapid, homogenised effectively helical flow of glass downwardly is achieved without difficulty. The flow is helical if the tube is rotated.

Because of the relatively small volume of the lower section (and the correspondingly short passage time therein for the molten glass) it is believed that inhomogeneities do not have a chance to build up and the resulting outflow shows a high degree of consistency leading to easier operation and, in particular, fewer reject items.

The present invention may be applied to feeding units both for continuous feed of molten glass and intermittent feed. It is of particular value in glass feeder arrangements where, within the rotating cylinder, are located one or more axially reciprocable gob plungers which cooperate with one or more corresponding apertures in the base of the forehearth to generate a train of successive gobs of molten glass which are passed to successive stations in a glass container forming machine or the like.

The detailed construction of the pouring basin in accordance with the present invention may vary very widely and will vary with the particular installation, type of glass, desired feed rate and the like. However, it is possible to make some general observations relating to the construction.

First of all, the basin may be of monolithic construction or made up by assembling a number of refractory shapes together. Monolithic constructions are preferred and according to a specific feature of the present invention, there is provided a glass-pouring basin having an open top and an apertured base, the top having a lateral inlet for connection to a forehearth, and the internal volume of the basin being notionally divided into an upper larger horizontal cross-sectional area section of substantially the same depth as the forehearth channel and, divided therefrom by a region of the inner wall of the basin, having in vertical section a convex shape, a lower substantially-smaller horizontal cross-sectional area section, the vertical depth of the lower section being substantially equal to that of the upper section. The shape of the wall of the basin in section may vary from three distinct lines, two vertical and one horizontal, with a squarish shoulder or knee dividing the upper from the lower section of the basin, to a smoother curve including an inflexion between an upper concave section starting near the top of the basin and a lower convex section terminating at the floor of the basin. Preferably, the horizontal cross-sectional area of the lower portion of the basin is essentially constant.

By substantial equality in connection with the vertical depths of glass in the two sections is not meant a mathematical equality but rather a general approximate equality, though this can itself vary within relatively wide limits. Indeed, it may not be particularly clear exactly where the lower section merges into the upper, particularly if the wall has not got a clearly defined annular shoulder but, for example, a sloping shoulder. Generally speaking, the transition from the upper to the lower region will occur at 40 to 60 percent of the total glass depth in the basin in use.

If desired, associated with the upper part of the basin (though they may also be provided for the lower smaller horizontal cross sectional area section) there may be glass condition sensors, for example temperature or viscosity sensors, and/or means to temper or condition the glass, for example heating means or particular insulation means.

BRIEF DESCRIPTION OF DRAWINGS

The invention is illustrated by way of example with reference to the accompanying drawings in which.

DETAILED DESCRIPTION OF PREFERRED EMBODIMENTS

Figure 1:
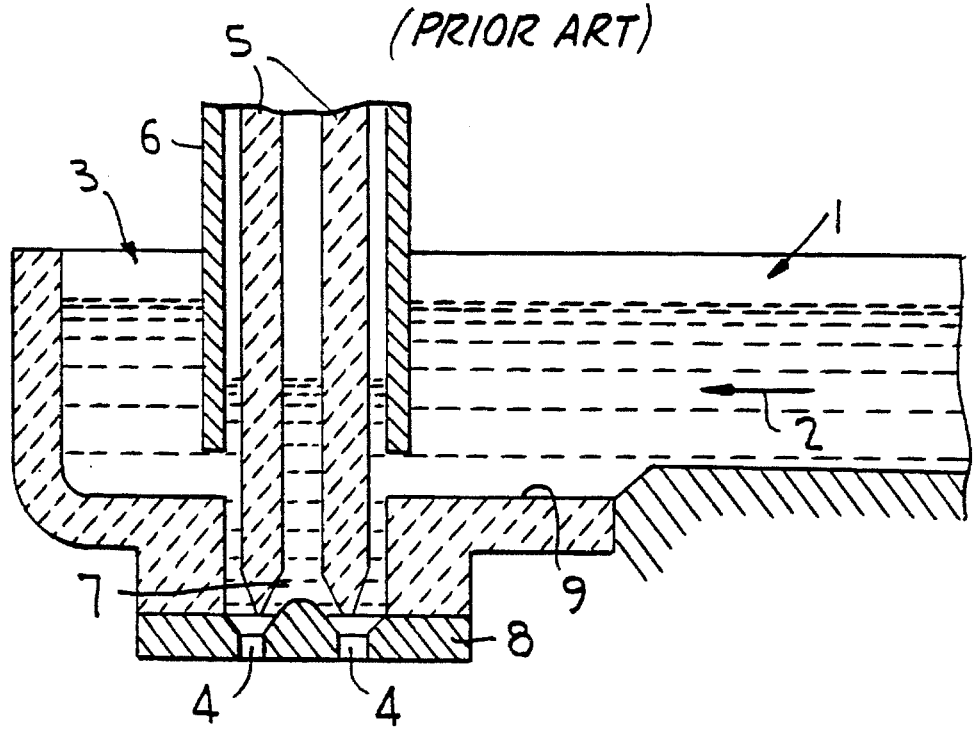
FIG. 1 is a typical diagrammatic section through the end of a forehearth in accordance with known feeder design.
Figure 2:
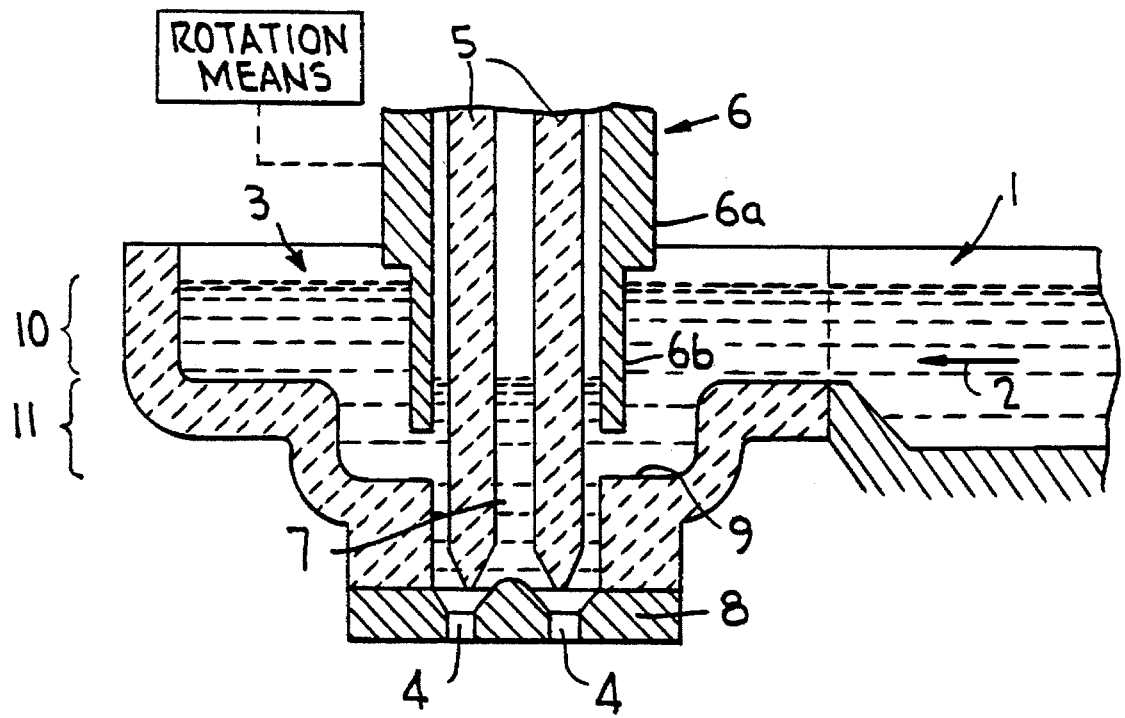
FIG. 2 is a view corresponding to FIG. 1 but showing the end of the forehearth provided with a basin in accordance with the present invention.
Figure 3:
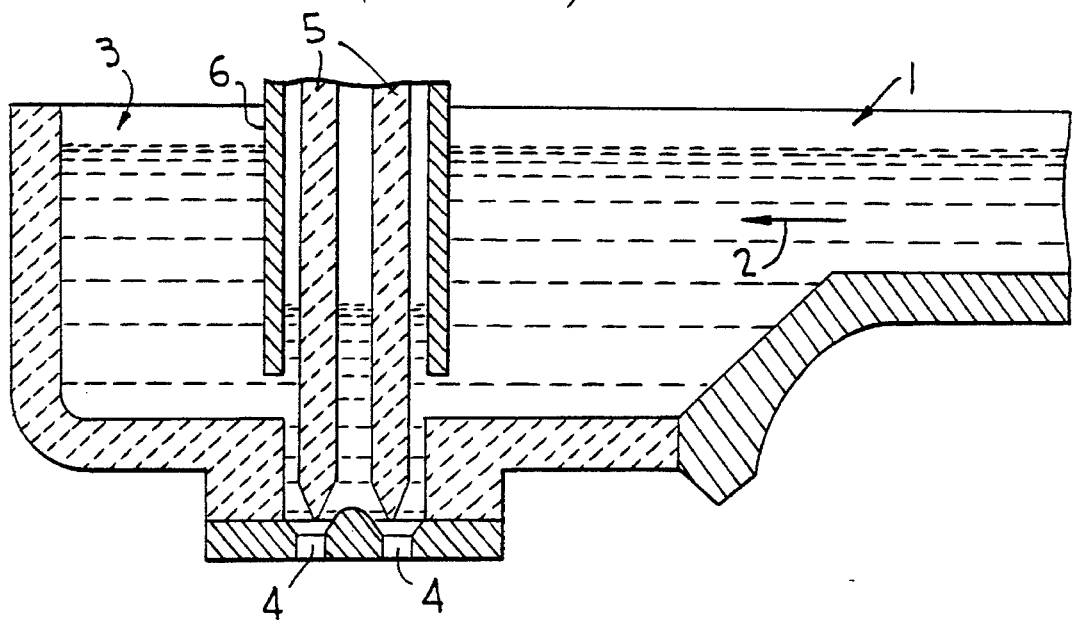
FIGS. 3 and 4 are respectively known and inventive structures, again illustrated diagrammatically, for a feeder designed to have a higher throughput of molten glass than those shown in FIGS. 1 and 2 respectively.
Figure 4:
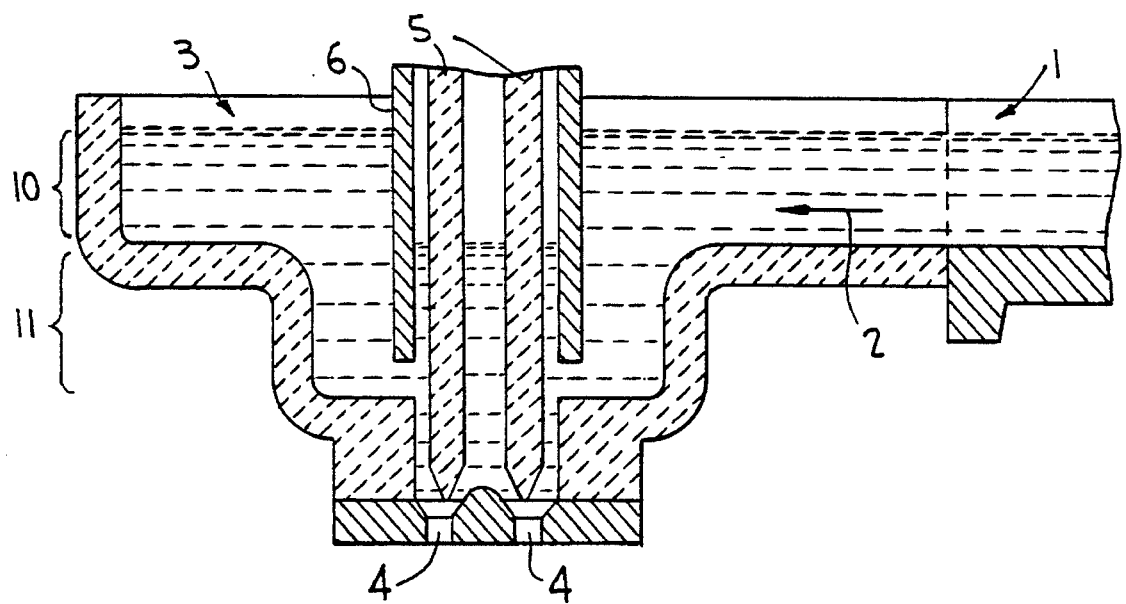

Referring to the drawings, like reference numerals are used throughout to denote like parts. Thus common to all four structures is a refractory lined forehearth 1 through which molten glass flows in the direction of the arrow 2 towards a feeder. At its end, the feeder is constructed as a refractory lined or monolithic basin 3 having in its base 9 a glass-discharge outlet 7 closed in turn by a closure member 8 having in it one or more apertures 4 through which glass may stream, or gobs of glass may be pressed by means of a vertically reciprocating pair of gob plungers 5 actuated by means not illustrated in the drawing. For the sake of clarity, the top structure, which is conventionally located above the feeder and which may, for example incorporate heating means, has been omitted.

Surrounding the plungers is a refractory hollow metering cylinder 6 which is slowly rotated and which may be raised and lowered to leave a gap between its lower end and the floor of basin 3 when it is desired to dispense and adjust the flow of glass through the outlet apertures.

The known structure of FIG. 1 does not lead to particularly homogeneous output from the apertures. However, when, in accordance with the present invention, the basin is divided into an upper portion 10 and a lower smaller cross-sectional area portion 11, it is surprisingly found that improved results are obtained. Preliminary experiments with structures in accordance with the invention have shown that the molten glass tends to flow gently and homogeneously through the forehearth channel into the top portion of the basin maintaining good homogeneity and is then rapidly and symmetrically moved down in the annular space between the cylinder 6 and the outer walls of the lower portion of the basin as molten glass is drawn through the apertures. With the gob feeder arrangement shown, the glass has only a relatively short dwell time in the lower space between the basin wall and the rotating cylinder, so it stays homogeneous while it is formed into gobs and ejected through the apertures 4.

A particular advantage or the basin design in accordance with the present invention is that it may be operated in simple fashion to avoid the formation of large and essentially stagnant volumes of molten glass. These tend to form in the upper regions of known pouring basins, and lumps of relatively more viscous glass can tend to break off from the stagnant regions and become entrained in, but not homogeneously mixed with, the glass as it flows out of the basin, thus leading to inhomogeneities in the products made from the glass. We have found that such problems may be minimised or alleviated entirely when operating with a basin in accordance with the present invention by regularly varying the rotational speed of the refractory cylinder and hence moving the location of the stagnant region. The effect is enhanced if the upper portion 6a of the refractory cylinder which is located in the upper section of the basin is of larger diameter than the lower portion 6b thereof located in the lower section of the basin.

Further advantages of the basin structure of the present invention consist in the availability of a relatively larger upper surface area for temperature control of the body of glass in the basin compared to the volume of the basin itself as contrasted with known basin designs. The narrower lower region, however, lends itself to fine temperature control, for example achieved by the provision of extra insulation or extra heating, thus improving the overall controllability of the glass dispensing process at the output end of the forehearth.

The basic design according to the present invention provides the advantages outlined above when used in connection with fixed cylinder/separate stirrer arrangements as well as with the rotating cylinder arrangement illustrated.

The detailed geometry and geometrical ratios may be varied widely without departing from the scope of the present invention. In contrast to the prior art basins, which were not divided into upper and lower regions, clearly distinct from one another, the present invention, by providing that division, provides a considerably improved homogeneity of glass output together with enhanced control possibilities.

It is within the purview of the present invention for the basin to be made and sold as a separate product. This permits it to be retro-fitted on to the forehearth of an existing furnace. The manner in which the basin could be connected to a forehearth does not form part of the subject-matter of this invention, and so will not be described herein in any greater detail.

I claim:

1. A dispensing basin for molten glass at the discharge end of a forehearth of a glass-making furnace wherein the dispensing basin has a base and side walls; said basin has a lower portion of horizontal cross-sectional area which is substantially less than a horizontal cross-sectional area of an upper portion thereof; said basin includes at least one discharge outlet in said base, at least one reciprocatable plunger which extends into the upper portion and the lower portion of the dispensing basin and which cooperates respectively with said at least one discharge outlet to form successive gobs of molten glass at each of said at least one discharge outlet, and a rotatable sleeve member present in the upper portion and lower portion of said basin and surrounding respectively each of said at least one reciprocatable plunger; said basin includes a first horizontal annular shoulder surrounding said at least one discharge outlet; and wherein spacing between said sleeve member and said first horizontal annular shoulder serves to meter the flow of molten glass; the improvement comprising providing a second annular shoulder in said basin above said first annular shoulder, said second annular shoulder being located such that said second annular shoulder is substantially at half the depth of molten glass which is present in the basin during use of the basin for dispensing molten glass, whereby to provide surrounding a lower portion of the sleeve member, an annular space through which molten glass flows from said upper portion of the basin to said spacing between said sleeve member and said first horizontal annular shoulder.

2. A basin according to claim 1 wherein side walls forming the lower portion of said basin are substantially concentric with said at least one discharge outlet.

3. A basin according to claim 2 wherein the horizontal cross-sectional area of the lower portion of said basin is essentially constant.

4. A basin according to either claim 1, 2 or 3 wherein said at least one discharge outlet has a first end through which molten glass enters and a second end through which molten glass exits, and is closed at the second end by a closure member having at least one aperture therein which is smaller in cross-sectional area than that of said at least one discharge outlet.

5. A basin according to claim 1 further comprising a means for rotating said rotatable sleeve member at an adjustable speed.

6. A basin according to claim 1 or 5 wherein said rotatable sleeve member includes an upper portion of a first diameter and a lower portion of a second diameter wherein the second diameter is smaller than said first diameter, and said lower portion of said rotatable sleeve member is circumscribed by the lower portion of said basin when said rotatable sleeve member is in operation.

* * * * *